F. LUCHINI.
PLOW.
APPLICATION FILED JUNE 10, 1907.
905,895.
Patented Dec. 8, 1908.
2 SHEETS—SHEET 2.
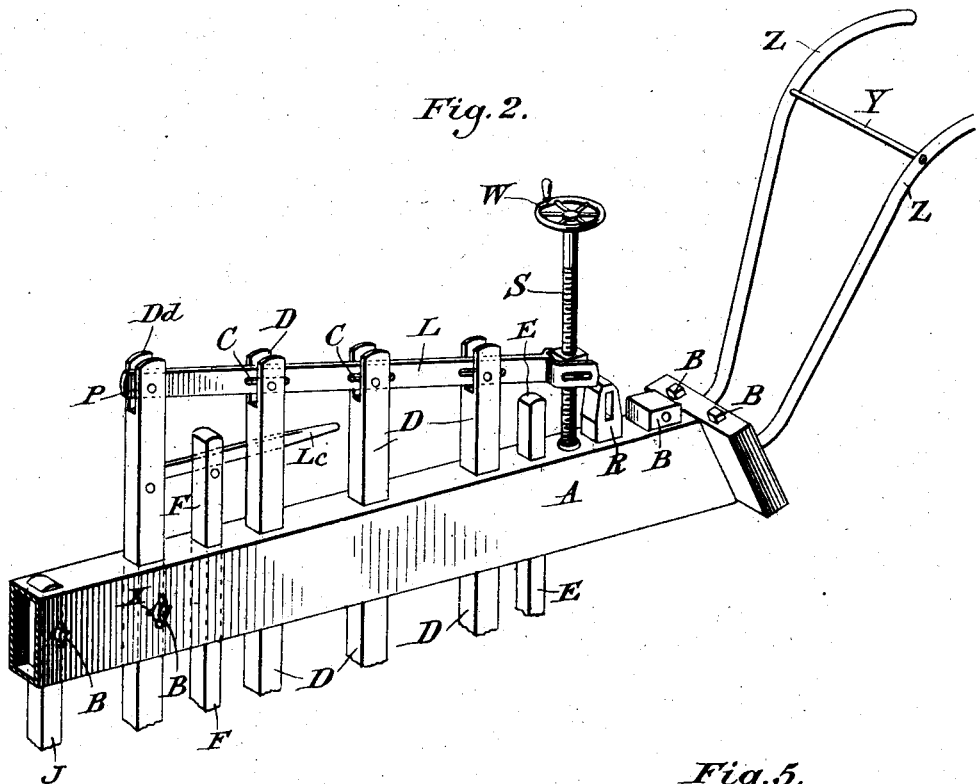
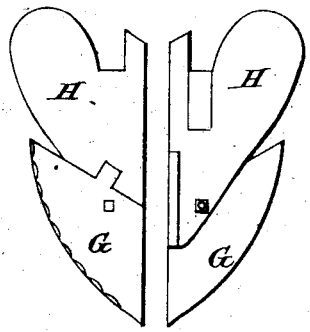
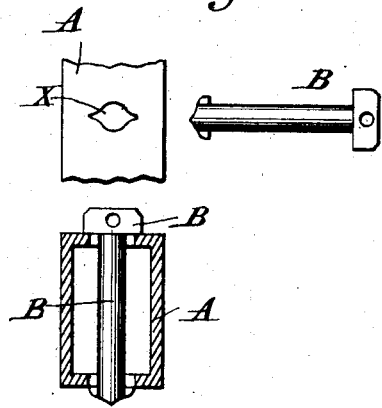
Witnesses:
Inventor:
Ferdinando Luchini
Attorneys

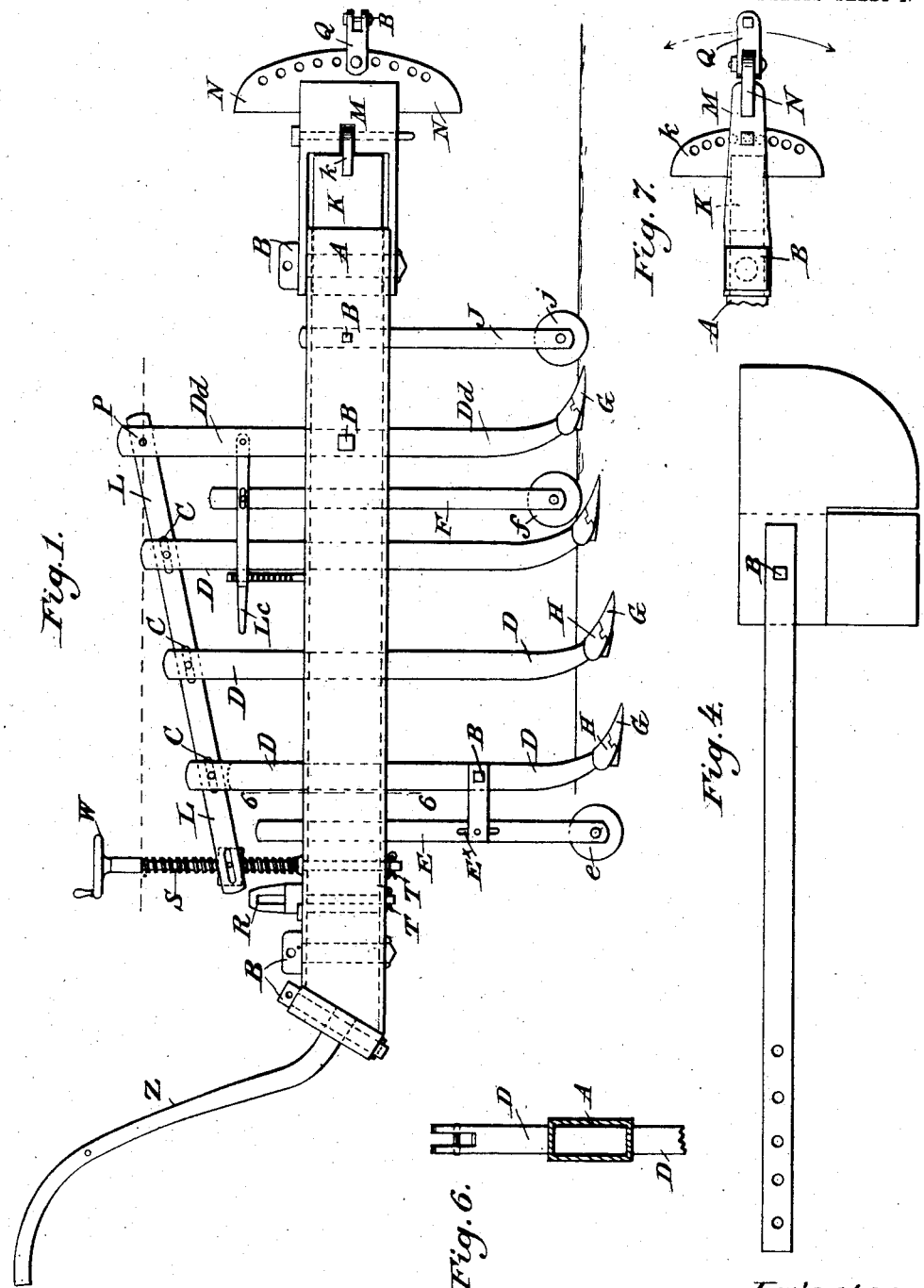

UNITED STATES PATENT OFFICE.

FERDINANDO LUCHINI, OF POWHATAN, LOUISIANA.

PLOW.

No. 905,895.   Specification of Letters Patent.   Patented Dec. 8, 1908.

Application filed June 10, 1907. Serial No. 378,318.

*To all whom it may concern:*

Be it known that I, FERDINANDO LUCHINI, a citizen of the United States, and residing at Powhatan, in the State of Louisiana, have invented certain new and useful Improvements in Plows; and I do hereby declare the following to be a full, clear, and exact description of the invention, such as will enable others skilled in the art to which it appertains to make and use the same.

My invention relates to plows, and the object of my invention is to produce a plow which shall be cheap to construct, simple to assemble, which shall require a minimum of power to operate and which will thoroughly pulverize the dirt.

To these ends my invention consists in the combination of parts and details of construction more fully hereinafter described and particularly pointed out in the claims.

Referring to the accompanying drawings forming a part of this specification, and in which like letters indicate like parts in all the views:—Figure 1, represents a side elevational view of my plow. Fig. 2, a fragmentary perspective view of certain of its parts. Fig. 3, a front and rear view of the plow points. Fig. 4, a plan view of a device for dirting the plants. Fig. 5, fragmentary views of the plow beam and bolt for securing the parts together. Fig. 6, a sectional view of said beam, showing the upper end of one of the plow stems, and Fig. 7, a detail of the forward end of the plow beam, showing the draft attachments.

A, represents the plow beam, which is made hollow and rectangular in cross section. Passing through the beam A, are a plurality of stems D D, as shown, the upper ends of which are slotted as best seen in Fig. 6, to receive the adjusting lever L. This lever L, is pivoted at P, to the forward stem D*d*, and is provided with the slots C, at each of the other stems D, through which pass suitable pins as shown. The rear end of lever L, is likewise slotted and receives a pin attached to a nut working on the screw S, controlled by the hand wheel W. This screw S, passes down through the beam A, and is rotatably secured on its under side as best seen in Fig. 1.

To the lower ends of the stems are secured the plow points each composed of the individual parts H and G, the mold boards H, being slotted to receive lugs carried by the points G proper, as shown in Figs. 1 and 3:— And the said forward stem D*d* is held in position by means of a suitable bolt B, which passes through the said parts and the beam A, as shown. Each of the plow points, except the first, are so adjusted by means of the hand wheel W, screw S, and lever L, that the second point following the first penetrates the soil to only a slight depth below the bottom of the furrow made by the first; the third point cuts a little deeper and the fourth deeper still. The first point being so fixed by the bolt B, that it cuts only to a slight depth, it results that the combined action of all the points, which follow each other in the same straight line, is to thoroughly pulverize the soil, and since no great portions of the soil have to be torn loose at the same time, that a minimum of power is required.

Colters *e, f* and *j*, mounted on stems E, F and J, respectively, and passing through the beam A, may be provided. The forward stem J, is fixed to the beam A, by a bolt B, and serves to regulate the depth at which the forward plow point will cut, the second stem F, slides through the beam A, and is regulated by means of the lever L*c*, pivoted to the stem D*d*, and its free end held by a suitable bracket rising from the beam A; while the third stem E, is slotted at E*x*, and connected to the stem D, of the last plow point, all as shown in Fig. 1.

Into the front of the beam A, slips the solid piece K, and over this piece K, and the end of the said beam, fits the shackle M, while a bolt B, secures the parts together as shown. Rigid with the piece K, is the curved plate *k*, provided with holes, over which the shackle M, may move, and through which a suitable pin may pass to secure the said shackle in any desired adjusted position. Rigid with the shackle M, is a similar curved plate N, provided with holes, into any one of which may be secured any suitable means Q, for attachment to the moving power.

The rear end of the beam A, is enlarged as shown, and handles Z Z made of gas pipe, suitably curved, are secured thereto. These handles are provided with a brace piece Y, extending from the one to the other. The bolt R, is suitably secured to the beam A, and is provided with the slot shown, which serves to secure the device shown in Fig. 4. This device consists of a stem provided with holes, two blades of thin steel secured to said stem by means of a bolt B, and its use is to dirt the plants.

The operation of my plow will be clear from the above, and need not be here repeated. But it will be observed that its parts are secured together by duplicate bolts B, which are readily locked and unlocked, and therefore the said parts may be readily assembled and disassembled.

Having now described my invention what I claim is:—

1. In a plow the combination of a rectangular hollow beam; a plurality of stems slotted at their upper ends passing therethrough; means for securing the forward one of said stems to said beam; a plurality of plow points attached to said stems; a slotted lever pivoted to the said forward stem and fitting the slots in the upper ends of all of said stems; a screw passing through said beam; a nut on said screw and a slotted connection between said nut and the rear end of said lever, substantially as described.

2. In a plow the combination of a rectangular hollow beam; a pair of bent pipe handles suitably braced attached to the rear end of said beam; a plurality of stems slotted at their upper ends passing therethrough; means for securing the forward one of said stems to said beam; a plurality of plow points attached to said stems; a slotted lever pivoted to the said forward stem and fitting the slots in the upper ends of all of said stems; a screw passing through said beam; a nut on said screw and a slotted connection between said nut and the rear end of said lever, substantially as described.

3. In a plow, the combination of a rectangular hollow beam; a pair of handles suitably braced attached to the rear end of said beam; a plurality of stems slotted at their upper ends passing therethrough; means for securing the forward one of said stems to said beam; a plurality of plow points attached to said stems; a slotted lever pivoted to the said forward stem and fitting the slots in the upper ends of all of said stems; a screw passing through said beam; a nut on said screw, and a slotted connection between said nut and the rear end of said lever, substantially as described.

4. In a plow the combination of a hollow rectangular beam; a pair of handles attached to the rear end thereof; a stem fixed to said beam; a plurality of stems adjustably secured to said beam; a lever pivoted to said fixed stem and having a suitable connection with said other stems; a screw for adjusting said lever and stems; plow points attached to each of said stems; and a piece K, mounted in the hollow of the forward end of said beam provided with the perforated plate k; substantially as described.

FERDINANDO LUCHINI.

Attest:
S. D. KEARNEY,
F. L. RAMBIN.